US007844863B2

(12) United States Patent
Hathorn et al.

(10) Patent No.: US 7,844,863 B2
(45) Date of Patent: Nov. 30, 2010

(54) RAMPED ERROR LOGGING SYSTEM

(75) Inventors: Roger G. Hathorn, Tucson, AZ (US);
Steven E. Klein, Tucson, AZ (US);
Daniel W. Sherman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 11/972,468

(22) Filed: Jan. 10, 2008

(65) Prior Publication Data
US 2009/0183036 A1    Jul. 16, 2009

(51) Int. Cl.
*G06F 11/00*    (2006.01)
(52) U.S. Cl. .......................................... 714/48; 714/39
(58) Field of Classification Search .................. 714/48, 714/44, 47, 57
See application file for complete search history.

(56) References Cited

U.S. PATENT DOCUMENTS

| 4,359,772 | A | * | 11/1982 | Patel | 714/761 |
| 6,098,181 | A | * | 8/2000 | Hamilton et al. | 714/25 |
| 7,225,368 | B2 | * | 5/2007 | Lancaster | 714/48 |
| 7,266,726 | B1 | * | 9/2007 | Ladd et al. | 714/27 |
| 2008/0155361 | A1 | * | 6/2008 | Demharter et al. | 714/704 |

* cited by examiner

*Primary Examiner*—Dieu-Minh Le
(74) *Attorney, Agent, or Firm*—Griffiths & Seaton PLLC

(57) ABSTRACT

A method for logging a repetitive error in a computer system is provided. The repetitive error is logged after each of a series of progressively increasing time periods. The logging commences when the repetitive error is first identified and concludes when the repetitive error is no longer identified.

20 Claims, 3 Drawing Sheets

RAMPED ERROR LOGGING SYSTEM

BACKGROUND OF THE INVENTION

1. Field of the Invention

The present invention relates in general to computers, and more particularly to a system and method for ramped error logging in a computer system.

2. Description of the Prior Art

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to mange the flow of data.

Generally, if an error occurs in a computer system, an entry is recorded in a particular type of historical record or log. For example, a computer system such as a storage system may record a respective number of errors seen in a particular time in a set of error counter mechanisms. A particular error counter will increment if the same error is again identified at a later point in time. A large number of repetitive errors may pose problems for the computer system. For example, a large number of recurring errors may fill up a log buffer and prevent other errors from being logged. In another example, a particular kind of error may not be immediately reported or may be reported some time after the error occurs.

SUMMARY OF THE INVENTION

A need exists for an error logging system and method which provides a quick response to identified errors, yet also accommodates repetitive errors seen over a longer period of time. Accordingly, in one embodiment, by way of example only, a method for logging a repetitive error in a computer system is provided. The repetitive error is logged after each of a series of progressively increasing time periods. The logging commences when the repetitive error is first identified and concludes when the repetitive error is no longer identified.

In another embodiment, again by way of example only, a system for logging a repetitive error in a computer system is provided. The system includes a controller operational on the computer system and configured for logging the repetitive error after each of a series of progressively increasing time periods. The logging commences when the repetitive error is first identified and concludes when the repetitive error is no longer identified.

In still another embodiment, again by way of example only, a computer program product is provided for logging a repetitive error in a computer system. The computer program product includes a computer-readable storage medium having computer-readable program code portions stored therein. The computer-readable program code portions include a first executable portion configured to log the repetitive error after each of a series of progressively increasing time periods. The logging commences when the repetitive error is first identified and concludes when the repetitive error is no longer identified.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
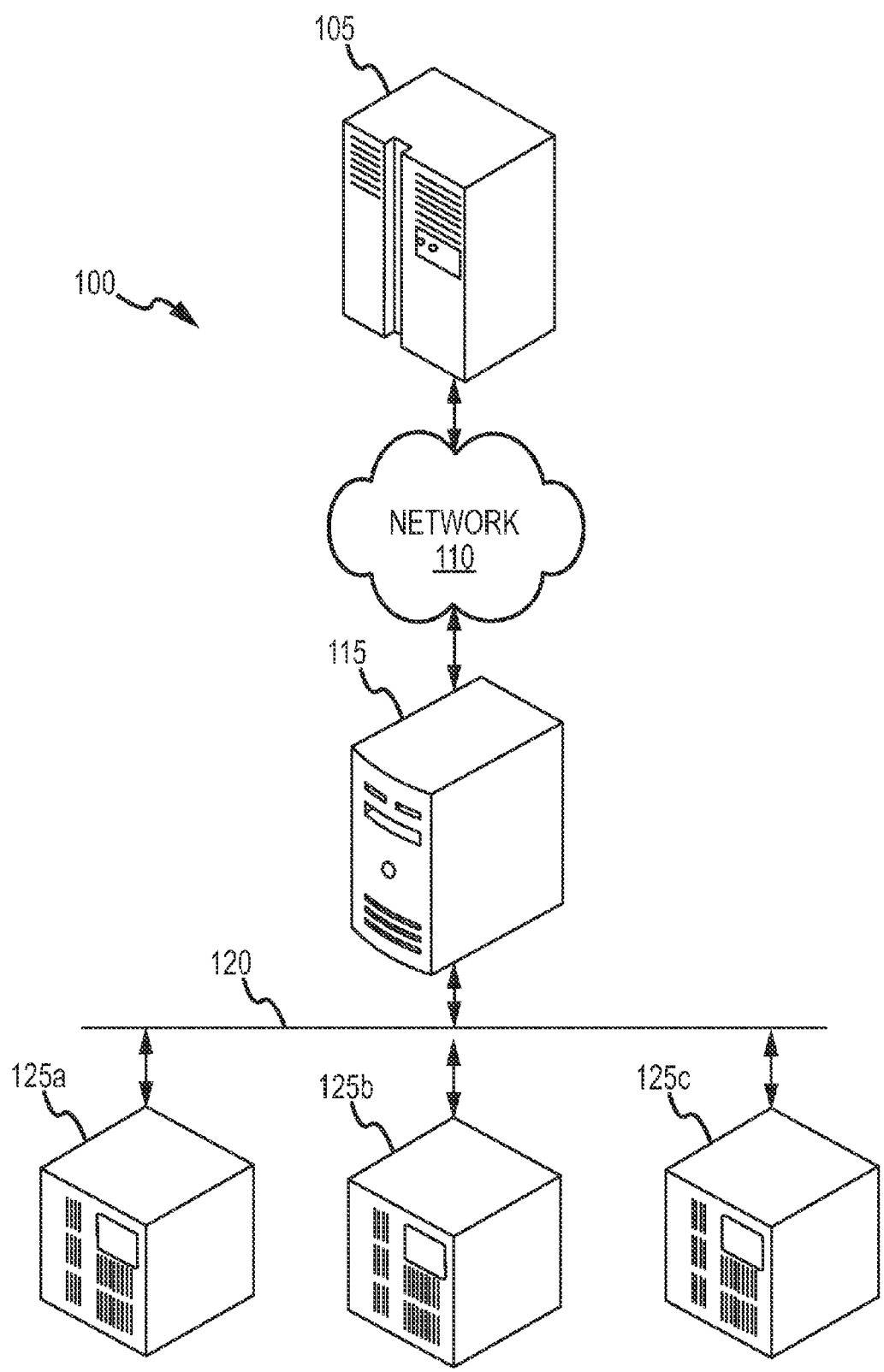
FIG. 1 is a schematic block diagram illustrating one embodiment of a computer system.

Error logging using error counter mechanisms, as previously described, may be performed in various ways. In one scenario, the error logging takes place a single time after the error counter increments due to an identified error. Such a scenario may prove to be inadequate in situations where an error is likely to continue recurring. For example, a fibre channel cable operational on a storage system may have faulty hardware that produces recurring bit errors on the fibre channel link. In a system where only one error is logged, the fact that the bit error is recurring is not ascertained since the error is only recorded once.

In a second scenario, a set of error counters may be logged for each time the error counter is incremented by an identified error. This second scenario is inadequate in situations where an error is continuously recurring along with limited buffer space to store the set of counters. Returning again to the fibre channel cable example discussed above, if bit errors continued occurring for a long period of time, the log buffer would quickly fill up and would prevent other errors from being logged. In these cases, the buffer would quickly be filled with error reporting and would either not report recent errors or would not report earlier errors.

In a third scenario, a set of counters may be logged if the counters increment a certain amount of times in a given time period (frequency). This third scenario is inadequate in situations where it is important to ascertain when an error first occurred, or whether the error is still occurring. An example of such a third scenario may occur if a fibre channel cable is improperly seated in a fibre channel port, causing occasional bursts of cyclical redundancy check (CRC) errors. Since the errors are not immediately reported, a network could continuously experience poor performance due to the occasional bursts of CRC errors, yet the CRC errors would either be reported a significant time after the CRC errors occurred or would never be reported if the frequency of the identified errors never reached a predetermined threshold. In these cases, the set of counters might not reach the threshold for a significant time after the first error was identified. In addition, the counters may not reach the threshold at all.

As a result of all three scenarios, error data may not be correctly analyzed. This is due to the fact that the error may have never been identified, it is impossible to ascertain when the error first appeared, or the packed error buffers keep other errors from being recorded.

The present description and claimed subject matter describe exemplary system, method, and computer program product embodiments for ramped error logging in a computer system, such as a data storage system. These embodiments monitor the computer system for errors. The first time that the error is identified, the error is reported (logged). Once the first error has been reported, a ramped error logging system is implemented.

Once the ramped error logging system is engaged, the system implements an increasing, variable set of time periods to wait before deciding to log the error again. After the system has waited a first variable time, if the set of error counters have incremented, the error is logged again. The system then repeats, each iteration increasing the variable time until a maximum time is reached. Once the maximum time is reached, the variable time remains constant. The system logs errors after each instance of the passage of the maximum time period until the error is no longer identified by the system. The ramped error logging system may be configured, modified, and updated in a variety of ways as will be further described.

Such a ramped error logging system is advantageous due to the increased amount of granularity of the error counter increment rate when the error is first seen. Such granularity is useful when it is desired to have additional details regarding the instant of time when a set of error counters begin to increment. After a given amount of time, these additional details about how a set of counters are incrementing are no longer as important as knowing that the set of counters are continuing to increment. The present system and method prevent an error log buffer from being jammed in situations where the set of error counters is incrementing rapidly and for long periods of time. In addition, however, the system and method provides granular details of when the error first occurs and long term details regarding if the error continues to be seen.

FIG. 1 is a schematic block diagram illustrating one embodiment of a data storage system 100 as an example of a computer system in which various aspects of the claimed subject matter may be implemented. The data storage system 100 includes a service center 105, a network 110, a controller 115, a storage system network 120, and one or more storage devices 125. Although the system 100 is depicted with one service center 105, one controller 115, and three storage devices 125, any number of service centers 105, controllers 115, and storage devices 125 may be employed. In one embodiment, the system 100 comprises the IBM System Storage DS8000 series manufactured by International Business Machines ("IBM") of Armonk, N.Y.

Storage device 125 stores and retrieves data. For example, the storage device 125 may be a magnetic tape drive, hard disk drive, optical storage device, solid state storage device, the like. Each storage device 125 is configured to detect an error condition. Error conditions may include read errors, write errors, data transmission errors, and the like. For example, the storage device 125 may detect an error condition when a calculated check sum for a read block of data is inconsistent with a recorded check sum for the data.

The controller 115 manages each storage device 125, communicating with the storage devices 125a-c through the storage system network 120. The storage system network 120 may be an Ethernet network, one or more fibre channel communication channels, or the like as is well known to those skilled in the art. In one embodiment, the controller 115 is configured as a center-of-room device, managing the plurality of storage devices 125 in the data storage system 100. For example, the controller 115 may manage bringing storage devices 125 on-line, taking storage devices 125 off-line, migrating data between storage volumes, initializing storage volumes, modifying firmware, performing diagnostic functions, and the like.

The service center 105 may monitor and maintain the controller 115 and the storage device 125 remotely. In one embodiment, the service center 105 communicates with the controller 115 through the network 110. The network 110 may be the Internet, a dedicated data connection, or the like. The service center 105 collects data on error conditions and performance for each storage device 125 in the system 100. In a certain embodiment, the service center 105 includes automated devices and operators that may analyze error condition data, forecast storage device 125 failures, schedule maintenance processes, schedule service calls, and arrange for storage device 125 replacements.

Service center 105, controller 115, or both devices may log errors received from storage devices 125a-c. As one skilled in the art will appreciate, however, a variety of reporting and logging schemes may be implemented such that various other components of system 100 or elsewhere may be utilized to report or log errors. For example, controller 115 and/or service center 105 may be configured, through hardware, software, firmware, or a combination thereof, to implement various aspects of the present description. Controller 115 may take various steps according to a method of ramped error logging as will be further described.

Figure 2:
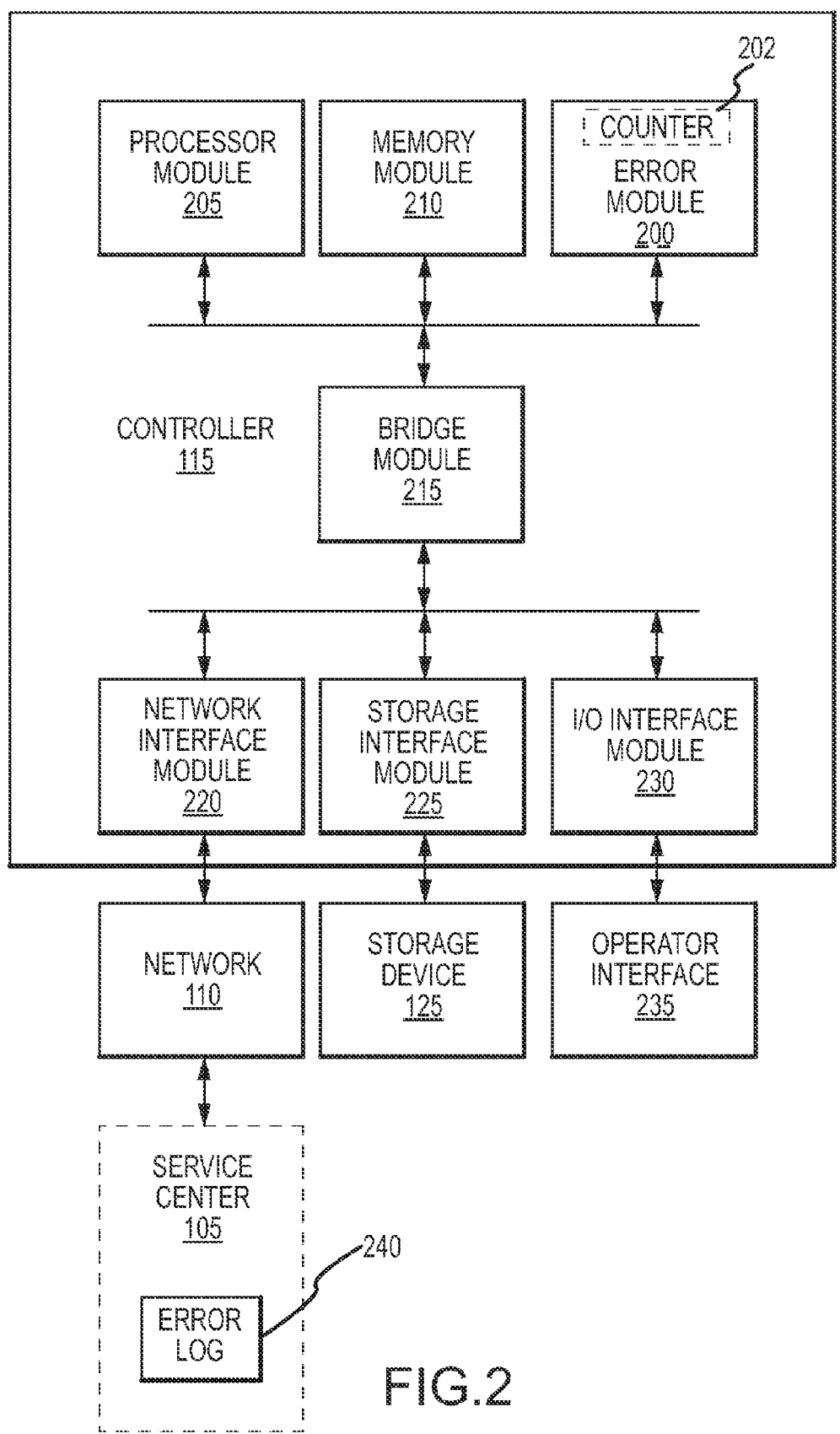
FIG. 2 is a schematic block diagram illustrating one embodiment of a controller of a data storage system.

FIG. 2 is a schematic block diagram illustrating one alternate embodiment of a controller 115. The depicted controller 115 may be one embodiment of the controller 115 of FIG. 1. The controller 115 includes an error module 200 having an error counter mechanism 202, a processor module 205, a memory module 210, a bridge module 215, a network interface module 220, a storage interface module 225, and an input/output ("I/O") interface module 230. The controller 115 is depicted in communication with a network 110, a service center 105, a storage device 125, and an operator interface 235. The network 110, service center 105, and storage device 125 may be the network 110, service center 105, and storage device 125 of FIG. 1.

Error module 200, processor module 205, memory module 210, bridge module 215, network interface module 220, storage interface module 225, and I/O interface module 230 may be fabricated of semiconductor gates on one or more semiconductor substrates. Each semiconductor substrate may be packaged in one or more semiconductor devices mounted on circuit cards. Connections between the error module 200, the processor module 205, the memory module 210, the bridge module 215, the network interface module 220, the storage interface module 225, and the I/O interface module 230 may be through semiconductor metal layers, substrate to substrate wiring, or circuit card traces or wires connecting the semiconductor devices.

The error module 200 includes an error counter mechanism 202 that increments when a repetitive error is again identified. The error module 200 may include a set of error counter mechanisms 202 corresponding to differing segments or differing components of the storage system 100 (FIG. 1). Error module 200 may include hardware or firmware. Error module 200 may execute software that receives and/or identifies errors, or coordinate error reporting and logging actions with other subcomponents such as memory module 210 or processor module 205.

The memory module 210 stores software instructions and data including software instructions and data. The processor module 205 executes the software instructions and manipulates the data as is well known to those skilled in the art.

The processor module 205 communicates with the network interface module 220, the storage interface module 225, and the I/O interface module 230 through the bridge module 215. The network interface module 220 may be an Ethernet interface and connect with the network 110 over an Ethernet connection. The network 110 may comprise an Ethernet interface and a router that communicates with the service center 105 over an Internet connection as is well known to those skilled in the art.

In one embodiment, the storage interface module 225 is a Fibre Channel interface. The fibre channel interface may communicate with one or more storage devices 125 through a fibre channel cable, although for simplicity the storage interface module 225 is depicted in communication with one storage device 125. In a certain embodiment, the I/O interface module 230 comprises a universal serial bus ("USB") interface. The USB interface may communicate with the operator interface 235 comprising a USB compatible keyboard, mouse, and the like. The I/O interface module 230 may also comprise a graphics module and communicate with a display comprised by the operator interface 235.

Service center 105 may receive reported errors from the error module 200. The service center 105 may record the reported errors in an error log 240. Error log 240 may be integrated into service center 105 or otherwise associated with service center 105. In alternative embodiments, the error log may be integrated into the error module 200, the memory module 210, or elsewhere. Duplicates of the error log may be found on one or more of these aforementioned components. In addition, an error log buffer (not shown) may be integrated into one or more of the components to temporarily store errors until they are recorded in a permanent error log such as error log 240.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
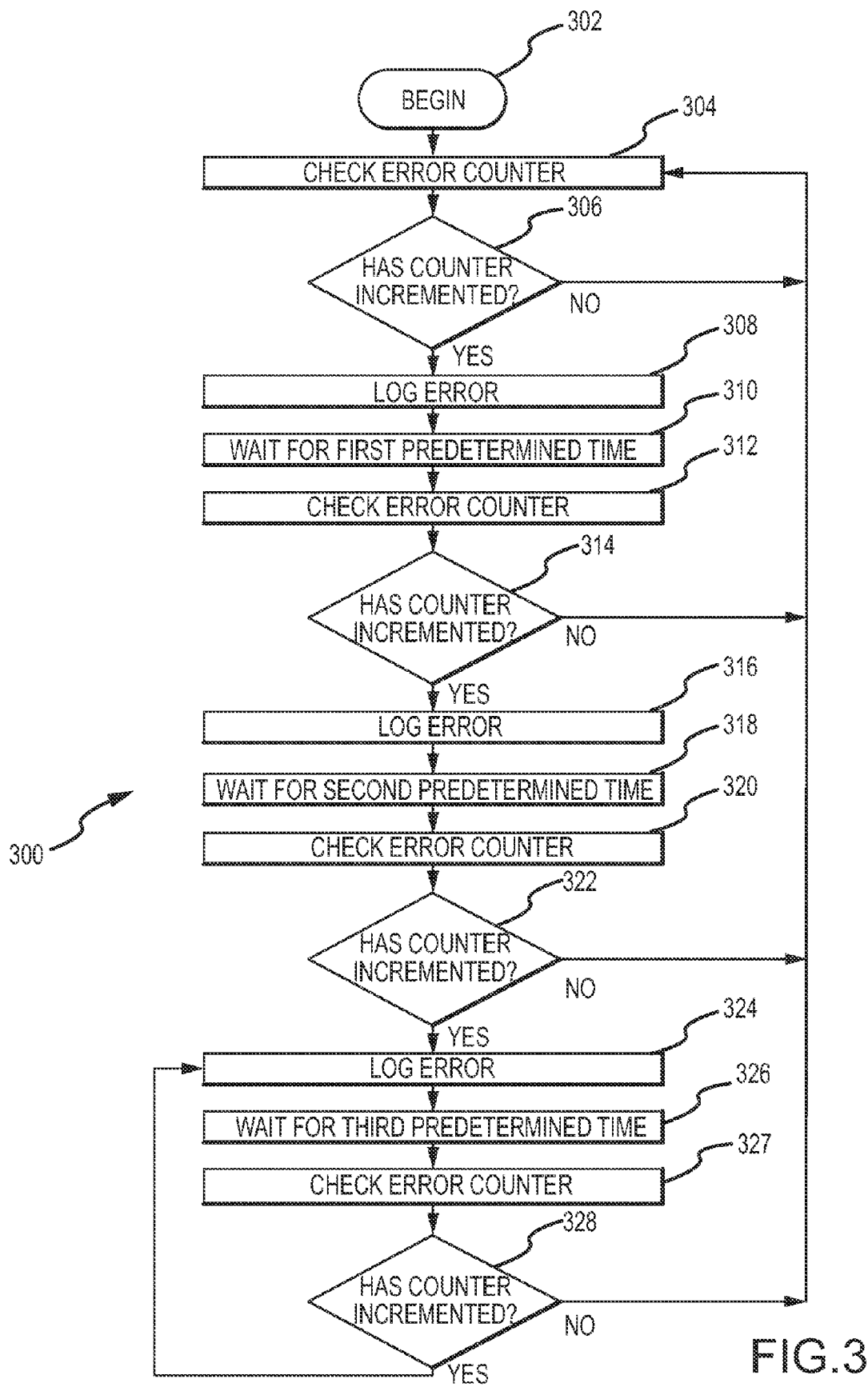
FIG. 3 is a schematic flow chart diagram illustrating one embodiment of a method for ramped error logging.

FIG. 3 is a schematic flow chart diagram illustrating one embodiment of a ramped error logging method 300. As one skilled in the art will appreciate, various steps in the method 300 may be implemented in differing ways to suit a particular application. In addition, the described method 300 may be implemented by various means, such as hardware, software, firmware, or a combination thereof operational on or otherwise associated with the computer system. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

A computer system such as a data storage system 100 of FIG. 1 may employ the method 300 in logging errors. For example, a controller 115 or a service center 105 (FIGS. 1, 2) may implement various steps of the method 300. The method 300 begins (step 302) by a check of an error counter 304 to identify an error in the computer system, such as the aforementioned fibre channel cable error. In one embodiment, the error counter may be checked once after a predetermined time interval. For example, the error counter may be checked every one (1) minute of elapsed time on a continuous basis until an error is identified. As such, in the instant embodiment, the predetermined time intervals are consistent in length.

An error may be identified in the system if it is determined that the error counter has incremented (step 306). If the error counter does not increment, then the system returns to step 304 to continue checking the error counter every predetermined time interval for errors.

If the error counter does increment, the system logs (or reports) the error (step 308). The system then waits for a first predetermined time period (step 310). In one embodiment, the first predetermined time period is about 60 minutes or 1 hour. At the conclusion of the first predetermined time period, the system then checks the error counter again (step 312) to determine if the counter has again incremented (step 314). In one embodiment, the recheck of the error counter may occur after passage of the predetermined time interval of step 304 such as the one (1) minute interval previously described.

If the counter has incremented, the system identifies the error as repetitive and implements progressively greater wait times according to a ramped error logging scheme. If the counter has not incremented, the system again returns to step 304 to continue checking the error counter every predetermined time interval for errors.

An identified repetitive error (pursuant again to an incremented error counter in step 314) is again logged (step 316). The system then waits for a second, increased predetermined time period (step 318). In one embodiment, the second predetermined time is about 300 minutes or five hours. As one skilled in the art will appreciate, however, each of the predetermined time periods may vary according to a specific implementation.

At the conclusion of the second predetermined time period, the system again checks the error counter (step 320) to determine if the counter has incremented (step 322). The recheck of the error counter may occur after passage of the predetermined time interval of step 304. If the counter has again incremented, the system identifies the error as repetitive and implements another progressively greater wait time according to a ramped error logging scheme. If the counter has not incremented, the system again returns to step 304 to continue checking the error counter every predetermined time interval for errors.

If the repetitive error continues to be seen pursuant to an incremented error counter in step 322, the error is again logged (step 324). The system then implements a predetermined maximum time period (step 326). In one embodiment, the maximum time period may be 360 minutes or 6 hours of elapsed time. At the conclusion of this third predetermined maximum time period, the system again checks the error counter again (step 327) to determine if the counter has again incremented (step 328). Again, the recheck of the error counter may occur after passage of the predetermined time interval of step 304. If the counter has again incremented, the system returns to step 324 to again log the error and again wait for the maximum predetermined time (again, step 326). This loop of waiting and logging continues until the error is no longer identified. If the counter has not incremented (indicating that the error is no longer identified), the system again returns to step 304 to continue checking the error counter every predetermined time interval for errors.

Again, as one skilled in the art will anticipate, a number of variations of the method 300 may be implemented to suit a particular application. For example, a greater number of progressively increasing predetermined time periods may be implemented than two as shown in the instant method 300. In another example, specific errors may be associated with specific ramped error logging schemes. The system may be configured such that a fibre channel link error as previously described triggers a differing ramped error logging scheme than a read error previously described. In each instance, however, a plurality of progressively increasing time periods serve to keep error buffers from filling, while the continual checking of error counters after a predetermined time interval serves to keep the system responsive.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for logging a repetitive error in a computer system, comprising:
    monitoring the computer system to identify the repetitive error,
    commencing the logging the repetitive error when the repetitive error is first identified and concluding when the repetitive error is no longer identified, and
    logging the repetitive error after each of a series of progressively increasing time periods, including logging the repetitive error after a first period of elapsed time, and if the repetitive error is identified again, logging the repetitive error after a second period of elapsed time, and if the repetitive error is identified again, continuing to log repetitive errors each after the second period of additional elapsed time until the error is no longer identified, the second period of time being time being longer than the first period of time, and any subsequent periods of time being longer than the previous occurring time period of the series of progressively increasing time period.

2. The method of claim 1, further including, if the repetitive error is not identified, continuing to monitor the computer system after each of a plurality of predetermined time intervals until the repetitive error is identified.

3. The method of claim 2, further including configuring each of the plurality of predetermined time intervals to be consistent in length.

4. The method of claim 1, wherein monitoring the computer system to identify the repetitive error includes checking an error counter to determine if the error counter has incremented.

5. The method of claim 1, further including, once a maximum time period of the series of progressively increasing time periods is reached, continuing to log the repetitive error after each passage of a plurality of passages of the maximum time period until the repetitive error is no longer identified.

6. The method of claim 1, wherein monitoring the computer system for the predetermined time interval to identify the repetitive error further includes checking an error counter after a first period of elapsed time to determine if the error counter has incremented.

7. The method of claim 1, wherein monitoring the computer system to identify the repetitive error includes monitoring a fibre channel link in a disk storage system to discover the repetitive bit error.

8. A system for logging a repetitive error in a computer system, comprising: a controller operational on the computer system configured for;
    monitoring the computer system to identify the repetitive error,
    commencing the logging the repetitive error when the repetitive error is first identified and concluding when the repetitive error is no longer identified, and
    logging the repetitive error after each of a series of progressively increasing time periods, including logging the repetitive error after a first period of elapsed time, and if the repetitive error is identified again, logging the repetitive error after a second period of elapsed time, and if the repetitive error is identified again, continuing to log repetitive errors each after the second period of additional elapsed time until the error is no longer identified, the second period of time being time being longer than the first period of time, and any subsequent periods of time being longer than the previous occurring time period of the series of progressively increasing time period.

9. The system of claim 8, wherein the controller is further configured for, if the repetitive error is not identified, continuing to monitor the computer system after each of a plurality of predetermined time intervals until the repetitive error is identified.

10. The system of claim 9, wherein each of the plurality of predetermined time intervals is consistent in length.

11. The system of claim 8, wherein the controller is further configured for, once a maximum time period of the series of progressively increasing time periods is reached, continuing to log the repetitive error after each passage of a plurality of passages of the maximum time period until the repetitive error is no longer identified.

12. The system of claim 8, wherein the controller is further configured for logging the repetitive error once after each of the series of progressively increasing time periods.

13. The system of claim 8, wherein the series of progressively increasing time periods includes a first period of elapsed time, a second period of elapsed time longer than the first period of elapsed time, and a third period of elapsed time longer than the second period of elapsed time.

14. A computer program product for logging a repetitive error in a computer system, the computer program product comprising a computer-readable storage medium having computer-readable program code portions stored therein, the computer-readable program code portions comprising:
    a first executable portion configured to monitoring the computer system to identify the repetitive error,
    a second executable portion for commencing the logging the repetitive error when the repetitive error is first identified and concluding when the repetitive error is no longer identified, and
    a third executable portion for logging the repetitive error after each of a series of progressively increasing time periods, including logging the repetitive error after a first period of elapsed time, and if the repetitive error is identified again, logging the repetitive error after a second period of elapsed time, and if the repetitive error is identified again, continuing to log repetitive errors each after the second period of additional elapsed time until the error is no longer identified, the second period of time being time being longer than the first period of time, and any subsequent periods of time being longer than the previous occurring time period of the series of progressively increasing time period.

15. The computer program product of claim 14, further including a fourth executable portion executable portion for, if the repetitive error is not identified, configured to continue to monitor the computer system after each of a plurality of predetermined time intervals until the repetitive error is identified.

16. The computer program product of claim 14, further including a fourth executable portion configured to, once a maximum time period of the series of progressively increasing time periods is reached, continue to log the repetitive error after each passage of a plurality of passages of the maximum time period until the repetitive error is no longer identified.

17. The computer program product of claim 14, further including a fourth executable portion wherein logging the repetitive error for each of the series of progressively increasing time periods includes logging the repetitive error once after each of the series of progressively increasing time periods.

18. The computer program product of claim 14, further including a fourth executable portion wherein the series of progressively increasing time periods includes a first period of elapsed time, a second period of elapsed time longer than the first period of elapsed time, and a third period of elapsed time longer than the second period of elapsed time.

19. The computer program product of claim 14, further including a fourth executable portion configured to monitor the computer system to identify the repetitive error includes checking an error counter to determine if the error counter has incremented.

20. The computer program product of claim 14, further including a fourth executable portion wherein monitoring the computer system to identify the repetitive error includes monitoring a fibre channel link in a disk storage system to discover a repetitive bit error.

\* \* \* \* \*